United States Patent [19]
Goss

[11] Patent Number: 6,014,289
[45] Date of Patent: Jan. 11, 2000

[54] INTEGRATED CIRCUIT ON A MONOCOQUE SUSPENSION

[75] Inventor: Lloyd C. Goss, Bloomington, Minn.

[73] Assignee: Hutchinson Technology Incorporated, Hutchinson, Minn.

[21] Appl. No.: 08/216,474

[22] Filed: Mar. 22, 1994

[51] Int. Cl.[7] .............................. G11B 5/48; G11B 21/16
[52] U.S. Cl. .......................................................... 360/104
[58] Field of Search .................................. 360/103, 104, 360/105

[56] References Cited

U.S. PATENT DOCUMENTS

| | | | |
|---|---|---|---|
| 4,792,875 | 12/1988 | Ohdaira | 360/104 |
| 4,797,763 | 1/1989 | Levy et al. | 360/104 |
| 4,942,491 | 7/1990 | Osawa et al. | 360/104 |
| 4,949,194 | 8/1990 | MacPherson et al. | 360/104 |
| 5,006,946 | 4/1991 | Matsuzaki | 360/104 |
| 5,055,969 | 10/1991 | Putnam | 361/398 |
| 5,121,273 | 6/1992 | Slezak | 360/104 |
| 5,132,857 | 7/1992 | Russell-Smith et al. | 360/104 |
| 5,245,489 | 9/1993 | Kimura et al. | 360/104 |

FOREIGN PATENT DOCUMENTS

| | | | |
|---|---|---|---|
| 0412739 | 2/1991 | European Pat. Off. | 360/103 |
| 59-207065 | 11/1984 | Japan | 360/104 |
| 60-246015 | 12/1985 | Japan . | |
| 62-217476 | 9/1987 | Japan | 360/104 |
| 63-261584 | 10/1988 | Japan | 360/104 |
| 63-292412 | 11/1988 | Japan | 360/103 |
| 3-25717 | 2/1991 | Japan | 360/103 |
| 3272015 | 12/1991 | Japan | 360/103 |
| 4219618 | 8/1992 | Japan | 360/104 |
| 4291066 | 10/1992 | Japan | 360/103 |
| 5-36048 | 2/1993 | Japan | 360/103 |

*Primary Examiner*—W. J. Klimowicz
*Attorney, Agent, or Firm*—Faegre & Benson LLP

[57] ABSTRACT

A head suspension assembly (HSA) for positioning a floating head assembly over selected tracks on the surface of a rotating data storage device, said head suspension assembly comprising a first surface, a proximal end region, a gimbal region acting as a gimbal flexure, and a head assembly with electric terminals attached to the gimbal region. The HSA also includes a spring region adjacent the proximal end region and a monocoque region located in between the gimbal region and the spring region. The monocoque region is a hollow shell having a closed plane figure cross sectional profile and includes a ceiling region and a floor region separated and spaced from each other, and an aperture that traverses both the ceiling region and the floor region. An integrated circuit having a plurality of control pins and a plurality of read-write pins fits into the aperture. A first set of electrical conductors connects the head terminals to the read-write pins and a second set of electrical conductors connects the control pins to exit terminal means for electrically coupling the second set of conductors to circuitry outside of the head suspension assembly.

18 Claims, 6 Drawing Sheets

INTEGRATED CIRCUIT ON A MONOCOQUE SUSPENSION

CROSS-REFERENCES

The following application is related to a co-pending application entitled MONOCOQUE SUSPENSION by the same applicant.

BACKGROUND OF THE INVENTION

The speed and capacity of today's computers requires storage systems that are capable of almost instantaneously retrieving and storing voluminous amounts of information. The preferred medium for achieving this objective is rotating data storage devices that store the information on disk files in dynamic storage devices or rigid disk drives. Disk files consist of one or more rotatable disks on which data is written concentrically and at extremely high densities. Each one of the thin concentric circles where data is stored is called a track. When the data storage device is in operation, an extremely sensitive transducer reads and writes information to and from selected tracks.

The transducer is usually attached to an air bearing slider which glides on a cushion of air nanometers away from the surface of the rapidly spinning disk. The transducer and air bearing slider assembly is also known as a "ehead" or head assembly.

A head suspension, which in turn may be attached to and moved by an actuator arm, is the spring element that supports the head. Head suspension refers to either a suspension with a head attached or a suspension designed to hold a head. A suspension (or suspension assembly) usually includes a load beam element, having carefully loaded spring regions and rigid regions, and a gimbal spring to hold the head level over the surface of the disk.

The carefully balanced combination of a suspension, a head, and other suspension related elements is known as a head suspension assembly (HSA). A multi-disk system will consist of several disks rotating in parallel to each other, with heads positioned both over the top and over the bottom surface of each disk by HSAs and actuator arms that resemble those of a turntable. The whole assembly moves in and out very quickly over the disk to access information.

The average time required to get the head to a track is called average seek time (typically less than 10 milliseconds). The average time required for data to reach the head from any given point on the track as the disk turns is called latency time (typically less than 6 milliseconds). Average access time is the combination of the average seek and latency times. Long access times result in significant delays due to the large number of data transfers required by today's systems. Therefore average access time is a crucial factor in marketing and operating a disk file system.

The closer the head can fly to the surface of the disk, the more densely can information be packed on its surface. Today's disk drives strive to reach head clearances close to 100 nanometers=0.1 micrometers (a human hair is 100 micrometers thick). Greater data densities allow for greater storage and smaller size. But the head must not touch the disk ("crash"), as the friction caused by the high rotational speed of the disk may damage the surface of the disk, thus destroying the data stored on it, as well as the head itself.

Constantly maintaining the desired head clearance is not an easy task as, when measured in nanometers, the surface of the disk is not flat and the head has to glide level and in parallel to the disk's contours. To compound the problem, the suspension which supports the head experiences extreme stresses as the actuator arm moves it rapidly from one concentric circle of data to the next. A suspension must be extremely stiff and rigid to withstand the shear forces of stop and go movement with minimum deflection. Stiffness measures the property of a material to resist deflection by the inertial loads involved in accelerations and decelerations. The suspension must also resist vibration after movement, as this delays the precise positioning of the head required for reading and writing closely packed data. Motion vibrations and excessive momentum cause the head to "overshoot" the intended thin track of data and take unacceptably long times to settle, thus causing errors and increasing the average access time. As momentum is directly related to mass, a heavy (large mass) head suspension assembly will increase momentum and average access times. The suspension must also account for thermal expansion and surface vibration due to external forces.

Since the revolutions per minute (RPM) of the disk are constant, the velocities of the surface of the disk and of the air stream increase as the head moves away from the center of the disk. Therefore, as the suspension moves from the inside track to the higher linear velocity outside tracks of the disk, it must resist changes in overall elevation. To hold the head at a controlled height the suspension must balance the pressure over the head to compensate the variable opposite lift of the changing air stream on the slider.

While being moved, the suspension must not twist (torque), or one corner of the head will be too close and the other too far from the disk surface. Yet, when flying over a single track, the suspension must be compliant to some pitch about a first axis and some roll about a second axis orthogonal to the first, in order to adjust the flight of the head over the contours of the disk. Thus, a flexible gimbal area which allows the head to remain level relative to the surface of the disk, even while a rigid region of the load beam experiences changes in inclination due to elevation changes, is desired. Yet, construction of this area must be as efficient as possible. Forming processes that change the topology of the suspension's surface to achieve gimbal flexibility add complexity to the manufacturing process.

The suspension and the head also must be very light and have a low mass to reduce inertial momentum during each positioning movement. A large mass would result in sluggish head movement, overshoot problems, crashes, errors, and long access time. The farther this added mass is from the center of rotation of the HSA, the more the suspension acts as a lever that magnifies its effect. This is compounded in more complex systems that consist of many suspensions moving in unison. Small reductions in the mass of each suspension also permit significant reduced power to the actuator assemblies having multiple suspensions. This results in reduced power consumption and reduced heat buildup.

During normal reading and writing operations a multitude of electrical signals must travel back and forth from the head. These signals encode the bits (ones and zeroes) of information just retrieved by the transducer or the new information to be stored to the disk. Today's systems write and read millions of bits in a matter of seconds.

To assure reliable and efficient systems, data transmission must be fast, yet very accurate. Letters and words are recognized by their respective bit sequences. An error in the transmission of one bit of information will result in an unidentifiable or mistaken sequence. Wrong sequences translate to wrong letters and eventually to garbled information and instructions.

Conductors must carry the bits back and forth between the head and the IC. Two of the factors likely to alter the precision of electrical data are parasitic capacitances and series resistances in these conductors. Both capacitance and resistance increase in a directly proportional relationship to the length of the conductor relaying the electrical signal. The weaker the signal, the more susceptible it is to these influences, leading to transmission errors.

In disk drives, the most troublesome signal conduction path occurs between the head and the IC. To be properly decoded and amplified, signals sensed by a head transducer must be relayed to the processing and amplifying circuitry. But the read signals travelling this path are relatively weak. Therefore, they are very susceptible to electrical distortion due to the thermal noise of the conductor resistance and to the low pass resonant circuit formed from the parasitic capacitance of the conductors and the inductance of the transducer coil. Even the seemingly short path between the head and circuitry located past the actuator arm may contain enough parasitic capacitance and resistance to significantly distort the signals and limit the data rate.

A solution to this problem is to shorten the distance between the head and the integrated circuit containing the processing and amplifying circuitry (commonly called the read/write chip). The shorter the conductor path the better the electrical purity of the signal. Some disk drive systems place an integrated circuit (IC) that performs the necessary functions on the rigid actuator arm.

The use of the actuator arm has the advantages of offering an ample stable rigid surface on which to place an IC and make all the necessary connections. The ICs required to drive the heads demand a large number of input, output, voltage, ground, and control signals. ICs are fragile, so it is preferable to place them on a rigid stable surface.

However, the path between the actuator arm and the head is still relatively long. Placing the IC even closer would further reduce the distorting influences. But this requires a flat rigid surface with enough room to place the IC and to route and connect the plurality of conductors (usually ten or more) required to relay signals to and from the IC. This surface must be flat and strong enough to shield the IC from twisting or bending to prevent breakage of the fragile ICs. To provide undesired thermal expansion, it also must provide a way to dissipate the heat generated by the electronic components in the IC.

The placement of the IC and the conductors must not affect the spring and load characteristics of the suspension. Added mass, especially near the head, greatly increases the inertial momentum and places great strain on the suspension. Also, not only do conductors require space, but they also have a stiffening effect on spring areas of the load beam and especially on the gimbal, which is usually the most flexible part of the suspension. Optimally, the electrical conductors and the IC must be securely attached in order to reduce movement and vibration which causes fluctuating input and output impedances. They must exhibit low profiles, in order to fit in today's compact disk drives, and must have reliable and easy-to-use connection points.

SUMMARY OF THE INVENTION

The present invention reduces the distance between the head and amplifying and processing integrated circuitry by placing the IC directly on the suspension. In order to do so, it discloses a novel monocoque HSA structure that offers a flat and extremely rigid monocoque region. This monocoque suspension is low in mass, yet extremely strong and able to withstand increased momentum and torque forces. The monocoque region includes a well-ventilated cavity specially suited to securely contain and protect the IC and its terminals. The monocoque suspension also requires minimal surface processing, leaving a flat unformed surface on which to run electrical conductors. The absence of alterations to the surface topology eliminates additional steps in the manufacturing process. The IC on this monocoque suspension is easy to mount and to service.

A head suspension assembly (HSA) positions a floating head assembly over selected tracks on the surface of a rotating data storage device. Interconnect systems on a HSA electrically couple the head to processing and amplifying circuitry. The present invention discloses a head suspension assembly comprising a first surface, a proximal end region, and a gimbal region placed at a distal end. It further includes a head assembly attached to the distal end region, a spring region adjacent the proximal end region, and a monocoque region located in between the distal region and the spring region.

The monocoque region is a hollow shell having a closed plane figure cross sectional profile. It includes a stiffener ceiling region and a floor region separated and spaced from each other. The monocoque region has middle aligned apertures, one traversing the stiffener region and one the floor region, shaped to receive and ventilate an integrated circuit (IC). A processing and amplifying IC, commonly called a read/write chip, may be substantially encased in between the two apertures. The operation of the IC is controlled by the inputs it receives at its various control pins (which include voltage and ground pins). The IC also includes a plurality of read-write pins, that receive and send input and output signals to the head assembly.

A first set of electrical conductors runs directly on a surface of the monocoque suspension and connects electrical terminals on the head to the read-write pins on the IC. Likewise, a second set of electrical conductors connects the control pins on the IC to exit terminal means for electrically coupling the second set of conductors to circuitry outside of the head suspension assembly. Although the monocoque structure allows enough space for almost any conductor known in the art, a preferred interconnect system uses strip conductors that resemble those of a printed circuit. To facilitate connection to circuitry outside the HSA, the HSA may include exit terminal tabs placed at edges of the proximal end region.

The monocoque region can consist of one or more pieces. Methods known in the industry, such as welds, adhesive, or crimping, can attach the pieces together. The shell itself can include concave surfaces joined by soft round angles, planar surfaces joined by sharp radial breaks, or combinations of both rounded and planar surfaces. The pieces can be made of metal, alloy, ceramics, plastics or other substances with high stiffness to weight ratios. Lips and flanges can extend at any junction to facilitate assembly and attachment. U-shaped or electro-polished lift surfaces may be added at sharp edges.

A preferred embodiment of this suspension can be fabricated with stainless steel that is thinner than that of ordinary load beams. The thinner material allows for bending at spring regions without necessitating any surface material removal.

None or minimal etching or material removal is necessary to fabricate the monocoque suspension, so the surface of the suspension remains flat and smooth. This allows electrical conductors that resemble printed circuits to run the length of a face of the suspension. Flex circuits and other suitable conductors also can be used. The conductors can be deposited directly on the surface of non-conductive suspensions, be individually electrically isolated, or rest on an added dielectric insulating coating. Additionally, a partial groove on selected areas of the load beam and gimbal region can receive the conductors and/or the insulating coating.

DESCRIPTION

Figure 1:
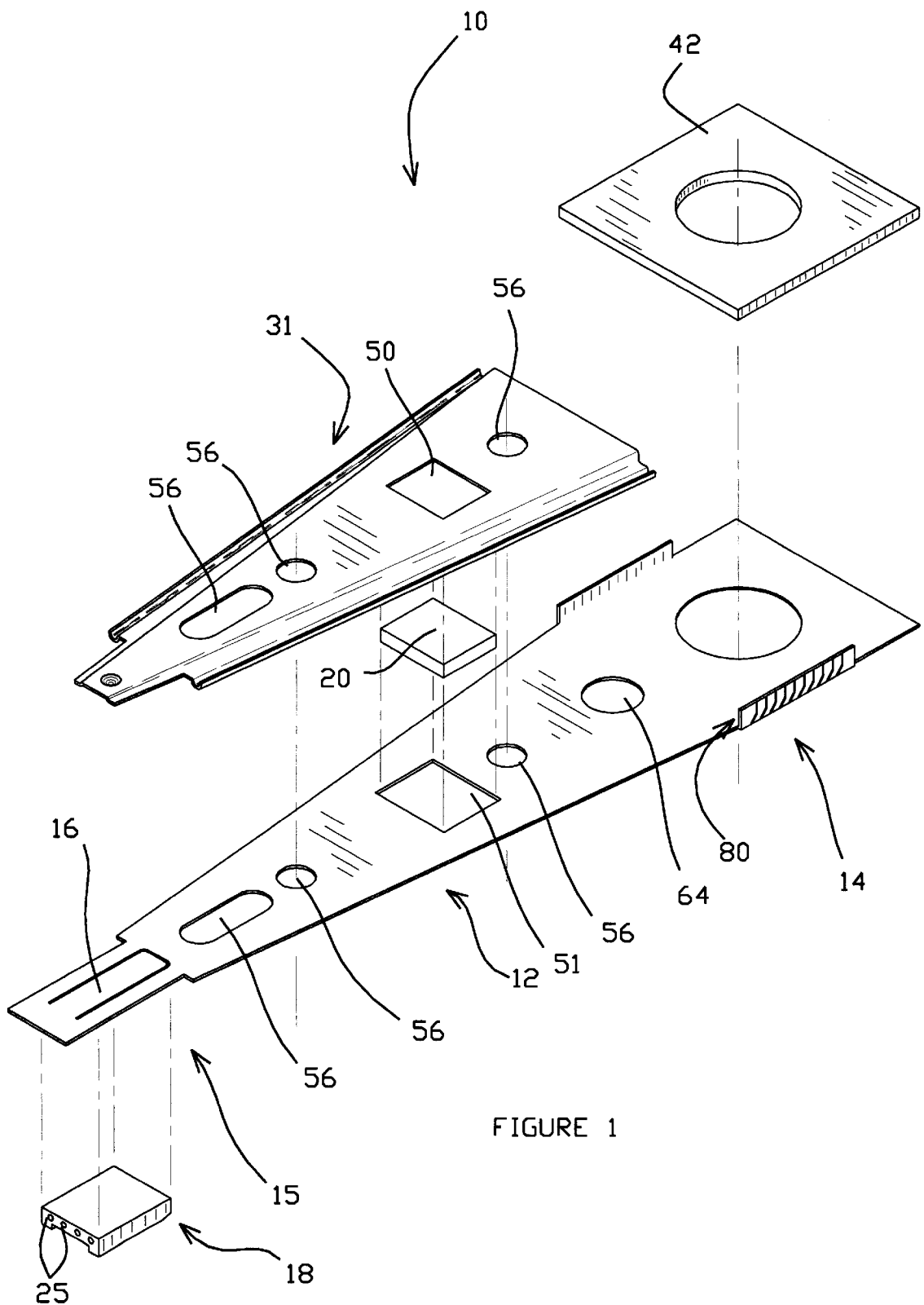
FIG. 1 is an exploded view of a head suspension assembly embodying elements of the present invention.

The present invention is an improved suspension for positioning a floating read-write head assembly over selected tracks on the surface of a rotating data storage device. It includes a stiffening monocoque shell and a more efficient construction. This allows for a more precise, stiffer, lighter, and more efficiently manufactured head suspension assembly. Additionally, the absence of a need for additional processing, leaves on the suspension a smooth, flat surface ideal for placing electrical conductors.

A monocoque shell is a structure in which the outer skin carries all or a major part of the stresses. A cross sectional cut along a plane perpendicular to the longitudinal axis of a monocoque shell results in a closed plane figure such as an ellipse or a polygon. This stress bearing structure puts material at the optimal points and spreads the loads. Monocoque shells have been successfully applied in aircraft and race car construction where extraordinary rigidity and stiffness is required, but reduced weight is needed for optimal performance. Since the stiffness of a beam increases in proportion to the third power of the thickness of the cross-section of the beam, the added thickness of a closed figure monocoque shell cross-section can increase stiffness by orders of magnitude in comparison to traditional planar beams. The fact that the shell is hollow and that it can be fabricated with relatively thin walls further results in reduced mass.

Typical suspensions (or suspension assemblies) include an elongated load beam, usually consisting of regions that are reinforced, prestressed, bent, or etched according to the need for rigidity or flexibility, a base plate at one end for mounting the load beam to an actuator arm, and a gimballing flexure at the other end for maintaining the head level near the surface of the disk. The combination of all the suspension elements and the head form part of a head suspension assembly (HSA). A HSA also includes conductors for transmitting electrical impulses to and from the head.

To accommodate a fragile IC and its additional mass, a suspension must be extremely stiff. Since stiffness increases in proportion to the third power of thickness, common methods for increasing the rigidity of a HSA include bonding additional layers of stiffening material or using a thicker material. Both methods require changes of the surface topology of those portions of the load beam which require flexibility by etching, bending or prestressing the material.

Suspensions made of thick materials are heavy and often require extensive surface processing. But neither wires nor thin and fragile insulating layers and electrical conductors readily transit through hinges, depressions, or raised reinforced areas. Suspension surfaces that have sharp edges or irregular surface topologies may chafe the outside insulator on wires or even sever electrical conductors, causing short circuits or opens and making the conductors unreliable. Conductors placed on the outer surface of bend regions may also fracture as the bend regions flex. Furthermore, processes required to change the surface topology of the spring areas increase production time and reduce the cost effectiveness of suspension assembly manufacturing.

Figure 2:
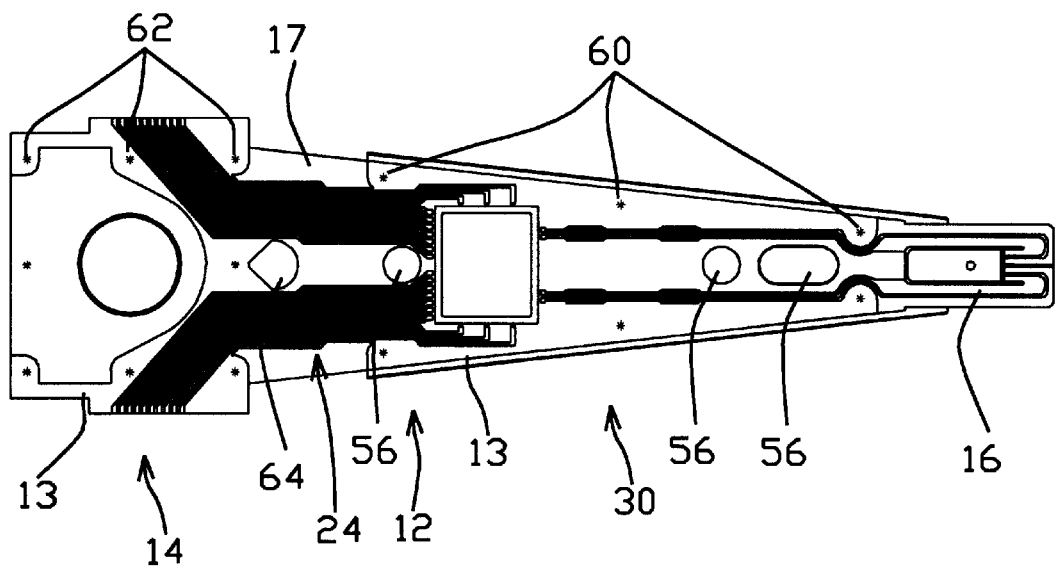
FIG. 2 is a top view of a first surface of the assembled HSA of FIG. 1, the monocoque region encasing a square IC.

FIG. 1 shows a perspective exploded view of a HSA 10 according to the present invention. FIG. 2 shows the top view of a first surface assembled version of the same HSA 10 of FIG. 1. HSA 10 includes a load beam 12 having a proximal end region 14, a distal end region 15 (shaped as a gimbal region 16), and a spring region 17. HSA 10 also includes a head assembly 18, an integrated circuit 20, and a stiffened and rigid monocoque region 30.

In the embodiment of FIG. 1, thanks to the thinner materials that the monocoque construction allows, the gimbal flexure (the gimbal region 16) is part of the same structural element as the load beam 12 and is located at the distal end region 15 of the load beam 12. It is constructed for supporting the read-write head assembly 18, shown in FIGS. 1 and 5, for gimballed motion relative to the surface of the data storage device (not shown). Shaping the distal end portion 15 of the load beam 12 as a gimbal region eliminates the need to attach a separate gimbal region structure and simplifies construction. A separate gimbal region may still be used in other embodiments.

Another detail shown in FIG. 1 is how the proximal end portion 14 can be shaped as necessary for attachment to an actuator arm (arm not shown), or, alternatively, for attachment directly to an actuator system in FIG. 2. The spring region 17 is adjacent to this proximal end portion 14 and in between the proximal end portion 14 and the rigid monocoque region 30. Spring region 17 provides needed vertical compliance for the load beam 12.

The monocoque region 30 is located between the distal end region 15 and the spring region 17. As shown in its cross-sectional cut shown in FIG. 4, the monocoque region 30 is a hollow shell having a closed plane figure cross sectional profile. It includes a ceiling region 32 separated and spaced from a floor region 34 and covers or encases an inner chamber between the two. The whole monocoque region 30 can be a unitary part of the load beam 12 or be formed by separate pieces. In the embodiment of FIG. 1, a monocoque shell 31 attaches to the load beam 12 to form the monocoque region 30. The monocoque shell 31 is a separate sheet material element formed to fit in an abutting complementary relationship over the load beam's floor region 34.

The monocoque shell 31 can be attached by welds 60, which can be seen in FIG. 2, to the top surface of load beam 12 to form the monocoque region 30. The two elements can also be crimped or adhesively bonded together. Lightening holes 56, such as those shown in FIG. 1 and 2, can be made in selected reduced stress bearing areas to further lighten the HSA 10 without appreciably reducing its stiffness. The same holes 56 or additional ones can perform as alignment and tooling holes.

Figure 3:
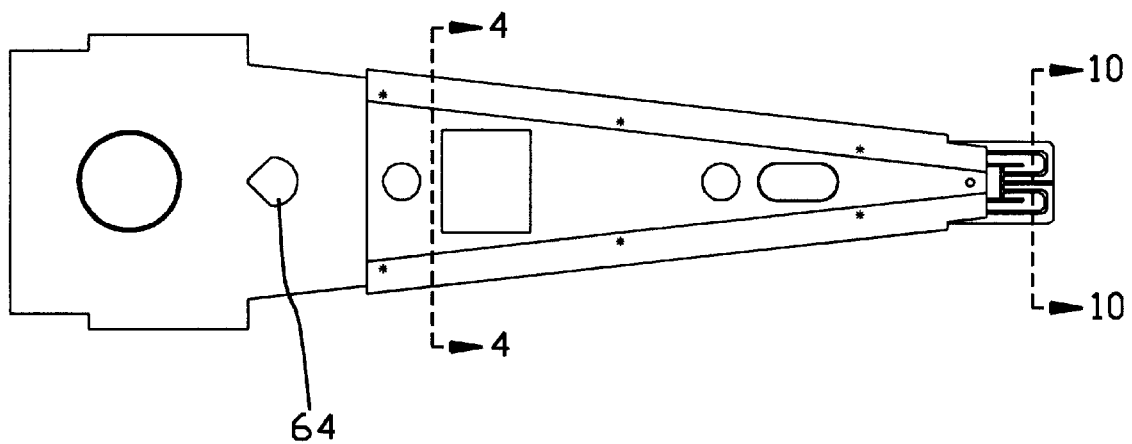
FIG. 3 is a top view of a second surface of the HSA of FIG. 1.
Figure 4:
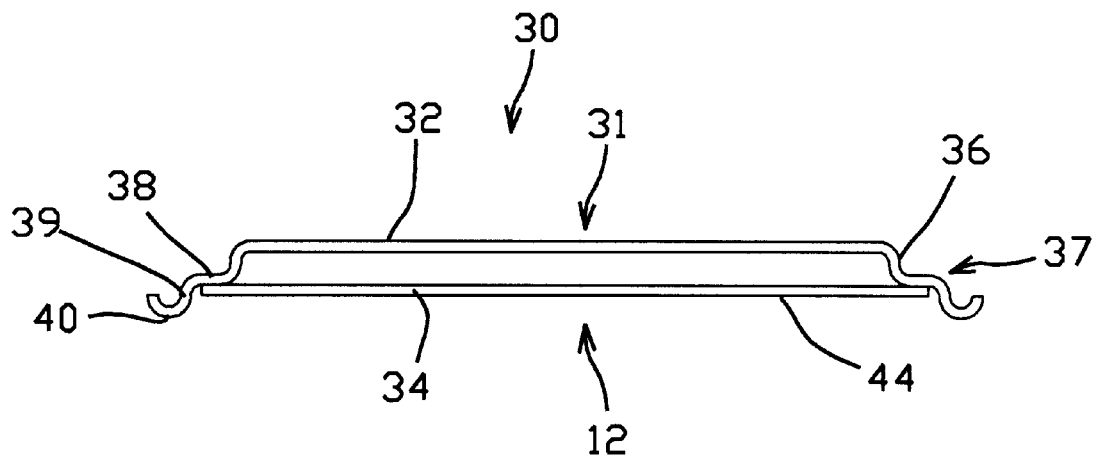
FIG. 4 is an enlarged view of a vertical cross-sectional cut at line 4—4 of the suspension depicted in FIG. 3.

FIG. 4 shows the closed figure cross-sectional profile of the monocoque region 30 at line 4—4 and how the monocoque shell 31 may mount onto the load beam 12 to form the monocoque region 30. The monocoque structure has excellent longitudinal stiffness and torsional stiffness due to the high cross section stiffness obtained from the separation distance of the ceiling region 32 and the floor region 34. In the embodiment of FIG. 3, the monocoque shell has side walls 36 projecting from the ceiling region 32, the walls separating the ceiling region 32 from the floor region 34. A step lip 37 extends from the edge of the side walls 36 to facilitate attachment. The step lip 37 includes a first bend step 38 extending generally outwardly and generally perpendicularly from the side flanges and a second bend step 39 extending generally away and perpendicularly from the first bend. As the edges of the thin shell are razor-sharp, the step lip 37 may finish in an electro-polished or U-bend lift surface 40 extending in a 180 degree soft radial break away from the second bend step 39.

The increased structural stiffness created by the design of the monocoque region 30 allows for thinner material to be used to construct the load beam 12, gimbal region 16, and the monocoque shell 31. In this embodiment, the load beam 12 is a wedge-shaped stainless steel sheet≈30 micrometers thick. The thickness of the material in a typical load beam is≈65 micrometers. A separation distance in this embodiment between the ceiling region 32 and the floor region 34 of only 250 micrometers results in an overall thickness for the monocoque region 30 of 310 micrometers. This yields an increase in stiffness in the magnitude of≈$(310/65)^3$≈108:1 ratio over previous HSAs. That is a hundred-fold increase in stiffness, without any significant increase in mass.

The thickness of the material in typical load beams often necessitated that the thickness of the spring regions be reduced by additional processes or that thinner gimbal regions be added in order to obtain the desired flexibility. However, in the version depicted in FIGS. 1 and 2, the uncommonly thin load beam material allows for the construction of spring regions where material removal is not necessary. In this specific suspension format, the monocoque shell 31 tapers down towards its distal end and the thin distal end portion 15 of the load beam 12 can be shaped as a rectangular tongue to naturally provide part of a gimballing spring region for attachment to the read-write head assembly 18. The distal end region 15 could be shaped differently to adjust to other gimbal designs or a separate gimbal might be added.

Figure 5:
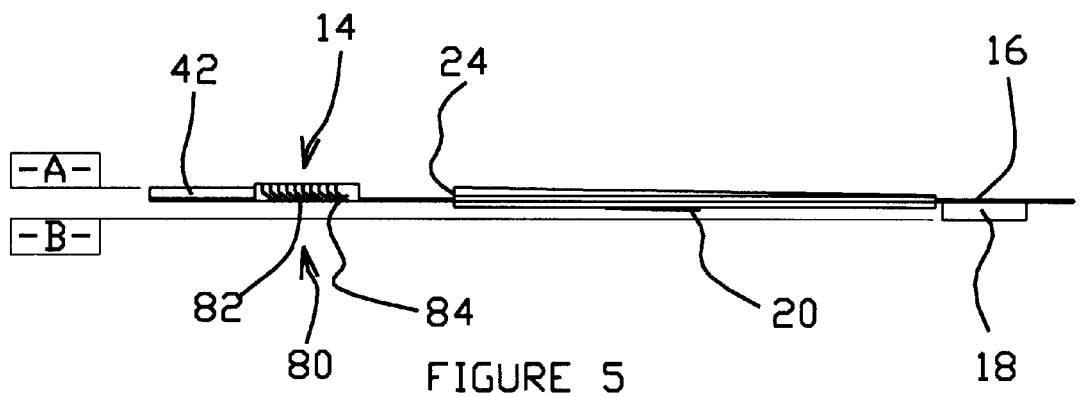
FIG. 5 is a side view of the suspension depicted in FIG. 1.

Thanks to the monocoque region very few areas may need additional reinforcement. Supporting base plate 42, more clearly seen in FIGS. 1 and 5, is an example of possible added support for the proximal end portion 14. The surface dimensions of the supporting base plate 42 are normally congruent with the surface dimensions of the proximal end portion 14, to assure a perfect fit. Welds 62, seen in FIGS. 2 and 9, join the proximal end portion 14 to the supporting base plate 42. If additional vertical compliance is needed, spring region apertures 64, seen in FIGS. 1–3, or reduced thickness areas can be incorporated into the spring region 17.

Figure 8:
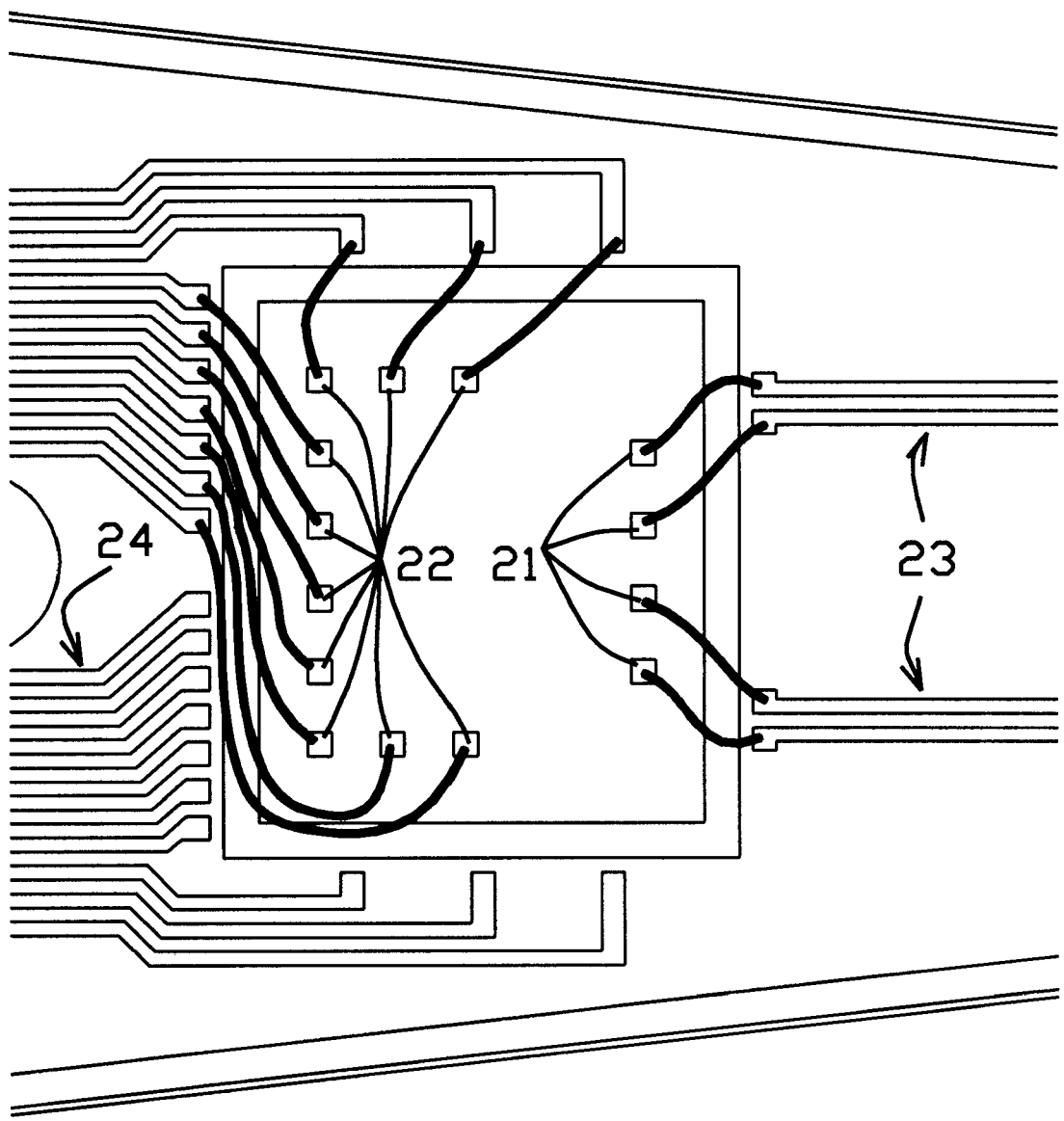
FIG. 8 is an enlarged view of the second set of conductors of the suspension of FIG. 1 connecting to the control pins and of the first set of conductors connecting to the read/write pins.

The IC 20 used in the embodiments in FIGS. 1–3 is VTC's VM 711420 xA removed from its plastic casing (the packaged version number is VM 711420 POJ). It measures 1.96×2.26×0.38 mm. As shown in FIG. 8, it includes a plurality of control pins 22 (including voltage and ground pins) and a plurality of read-write pins 21 (the pins that relay the read-write operations of the transducer). A first set 23 of electrical conductors connect electrical head terminals 25 on the head assembly 18 to the read-write pins 21. A second set 24 of electrical conductors connects the control pins 22 to exit terminal means 70, shown in FIG. 9, that electrically couple the second set 24 of conductors to circuitry outside of the HSA 10.

To help place and ventilate the surfaces of the IC 20, the monocoque region 30 has a ceiling aperture 50 traversing the stiffener ceiling region 32 and a floor aperture 51 traversing the floor region 34. The apertures are shaped to receive the IC 20 and encase it generally inside the hollow of the monocoque region 30. These apertures are only possible due to the monocoque region's unprecedented stiffness. Similar apertures on traditional load beams could seriously weaken their structural strength. A version without a ceiling aperture, and therefore even better structural stiffness, also is possible. If no apertures are desired, the entire suspension also can be designed to serve as a heat sink to funnel away the heat generated by the IC 20.

The apertures are aligned directly atop each other and are shaped to receive the IC 20 and encase it in the hollow chamber inside of the monocoque region 30. In a preferred embodiment, the ceiling aperture 50 has a shape that is similar to the shape of the IC 20, but is 0.50 to 0.25 millimeters smaller than the chip 20 at each edge. This creates an overlap edge 53 all around the ceiling aperture 50.

In turn, the floor aperture 51 is larger than the IC 20 and overlaps ceiling aperture 50. IC 20 can be inserted into the monocoque cavity of a finished suspension through floor aperture 51. It then can be centered against the ceiling aperture 50 and attached at its edges to the overlap edge 53. Although in a preferred low profile monocoque HSA embodiment the VTC IC may slightly protrude, the space inside the monocoque region 30 is large enough to totally encase a custom IC and all of the connections to its pins. The conductors can be attached to the IC pins by traditional wire bonding. The aperture 50 allows the IC 20 to use the disk below as a fan to dissipate heat and ventilate the surface of the IC 20. Also it allows addition of the IC 20 to be one of the last steps of manufacture of the HSA 10, thus eliminating possible thermal damage during welding or fractures caused by stress while fitting different parts.

Figure 6:
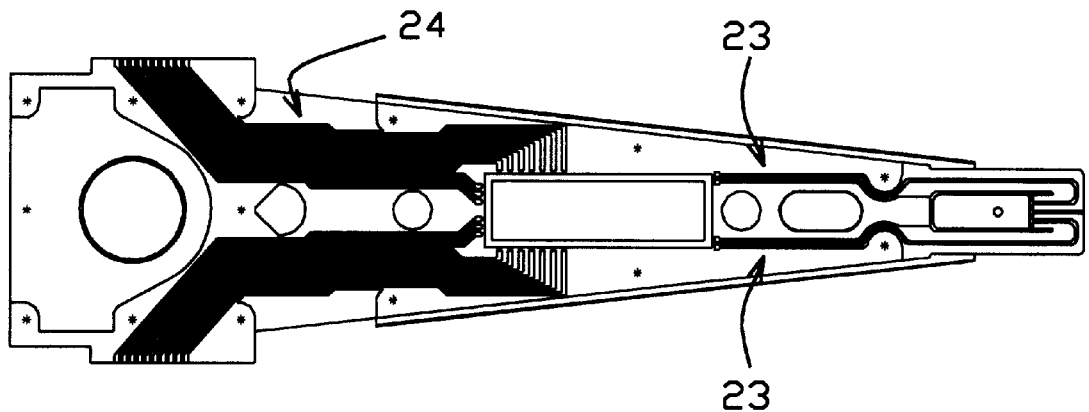
FIG. 6 is a top view of a first surface of another head suspension including elements of the present invention, this suspension containing a streamlined elongated IC.
Figure 7:
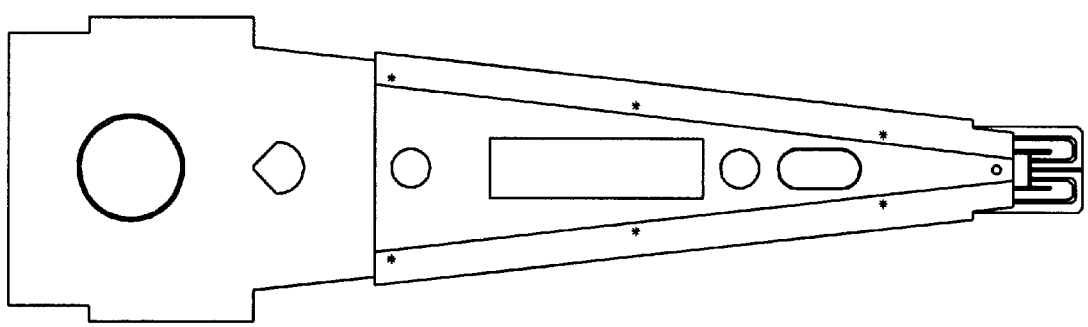
FIG. 7 is a top view of a second surface of the head suspension of FIG. 6.

The apertures 50 and 51 can adjust to fit different IC 20 designs. FIGS. 6 and 7 use a different streamlined elongated IC design that allows further reduction on the length of the first set 23 of conductors between the head terminals 25 and the read/write pins 21. Custom made ICs could be placed at the very tip of the distal end of the monocoque region 30 to further reduce the conductor length.

In the embodiments shown, the load beam 12 and gimbal region 16 are essentially planar and have two faces or sides. The use of a raised shell region only partially disturbs the profile of one face (second surface) of the load beam 12. The stiffness of the monocoque region 30 and the use of thinner materials that do not require additional surface processing leaves a first surface 13 of the suspension, shown in FIG. 2, with an essentially smooth and flat surface topology. The first surface 13 includes a flat surface along the load beam 12 and a flat surface along the gimbal region 16. Taking advantage of the relatively smooth and flat first surface 13, the first and second set of electrical conductors extend longitudinally over at least a portion of the length of the first surface 13. The conductors can be connected directly to pins already on the IC 20. The length, number, and position of the conductors may change according to the signal transmission needs of a given IC 20 and head assembly 18. Since there is so little surface processing, conductors could also run on portions of the second surface of the load beam 12.

Figure 9:
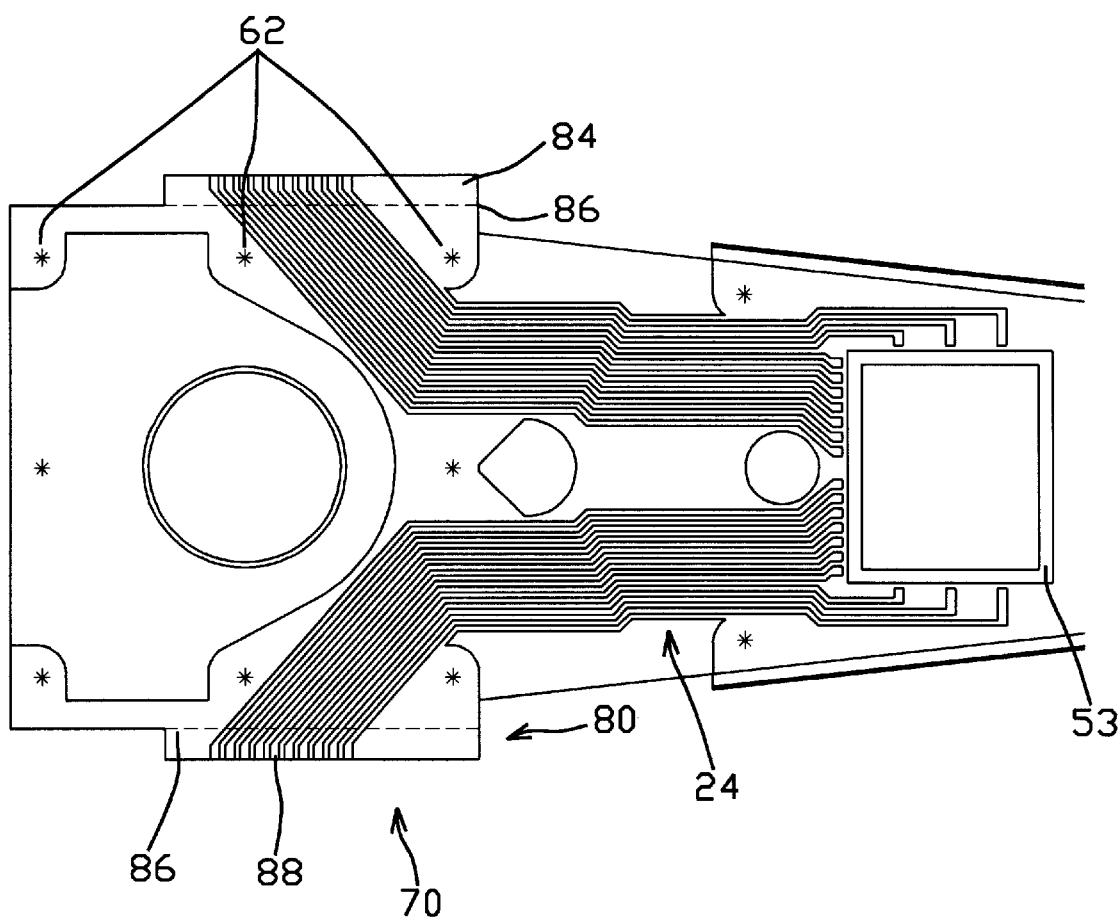
FIG. 9 is an enlarge view of the exit terminal tabs of the suspension of FIG. 1.

The exit terminal means 70 include at least one electrical terminal tab 80, better seen in FIGS. 1 and 9, that extend outwardly from sides of the proximal end portion 14 of the load beam 12 to facilitate connection to circuitry outside of the suspension 10. These terminal tabs 80 include a proximal end portion of the second set 24 of electrical conductors, side wings 84, and an axis of bend 86 generally parallel to the sides of the proximal end portion 14. The side wings 84 extend outwardly in the same plane as the load beam 12 from a side of the proximal end portion 14 of the load beam 12. The second set 24 of conductors spreads into a wider contact pad ends 88 at the edge of the terminal tab 80.

The axis of bend 86 is parallel to the edge of the proximal end portion 14. Along the axis of bend, the side wings may bend up to 90 degrees for easier connection. In order to reduce the tension and stress on the conductors at the bend, the second set 24 of conductors traverses the axis of bend 86 at an acute angle. A smaller angle between the conductors and the axis of bend 86 results on a reduced stress on the outer fibers of the conductors. The same angled layout may be used when conductors traverse a spring region 17 or gimbal region 16.

The HSAs shown in the drawings all include exit terminal means 70 that include two terminal tabs 80, each located at one side of the proximal end portion 14. At least half of the second set 24 of conductors ends at one terminal tab and the rest end at the other.

If welds 60 and 62 are used to assemble the HSA 10, the electrical conductors are spaced from the weld pattern to prevent thermal damage. The conductors can be printed circuit conductors, flex circuit conductors, or other reliable conductors. They can be formed directly on a surface of the load beam 12 using known methods such as vapor deposition or photolithography. Another method is for the conductors to be made of a conductive material laid down in long strips atop a thin insulating coating 72 which electrically isolates the conductors from the load beam 12. An adhesive may double as an insulating coating 72 and as a bonding means. A layered structure of a metal load beam, a dielectric layer, and a conductor layer is also possible.

For non-conductive suspensions or for independently electrically insulated conductors, the insulating coating 72 would not be necessary. In the present 300 series stainless steel embodiment, the insulating coating 72 consists of polyamide resin≈6.35 micrometers thick. The combination dielectric adhesive and an anodized aluminum load beam and/or monocoque shell also could be used. The conductive material is copper≈6.35 micrometers thick and≈50 micrometers wide. Other materials with good conductivity, such as copper alloys, can also be used. The conductors are spaced≈50 micrometers apart from each other. Other similar materials commonly used in the industry of varying thicknesses and widths also could have been used for both the insulating coating 72 and the conductors.

Figure 10:
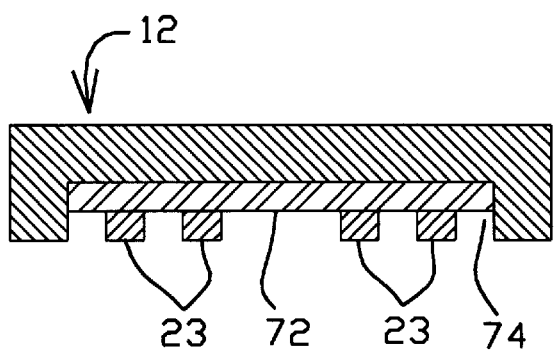
FIG. 10 is a much enlarged view of a cross-sectional cut at line 10—10 of a partial groove in the flat face of a gimbal region, receiving a dielectric coating and conductors.

In order to solve potential problems caused by conductor mechanical yield stress in the spring regions due to the sandwich construction of the load beam 12, insulating coating 72, and conductors, a groove 74, shown by FIG. 10, can be manufactured or etched on selected surfaces of the HSA 10 to receive the insulating coating 72 and/or the conductors. Critical flexibility areas on which grooves 74 may be placed are the surface of the spring region 17 of the load beam 12 and the surface of the gimbal region 16. The grooves 74 also may run the whole length of the conductors on the HSA 10. Laying the conductors in the partial groove 74 reduces the distance from the outer fibers of the conductors to a neutral axis of bend of the spring regions. This reduces the stress effects on the conductors and the rigidity the additional elements add to the spring regions.

In the depicted embodiments the monocoque shell 31 is made preferably of 30 micrometer thick stainless steel. It attaches by six weld points 60 to the floor region 34 of the load beam 12. The monocoque shell 31 also can be adhesively bonded or crimped to the load beam 12 or can be molded of the same piece of material than the load beam 12. For still other embodiments, the monocoque shell 31 and the load beam 12 can be made of different materials. Preferred materials are those with an elastic modulus and a density similar to those of stainless steel. In order to satisfactorily flex at the spring regions, the material for the load beam 12 element must be formable to set the load that balances the slider's air bearing pressure. But it must also have a high yield strength to prevent plastic deformation during normal operation. In contrast, the monocoque shell 31 experiences minimal flexure, so an anisotropic material, such as alumina ceramics, can be used, as well as isotropic materials such as metals, alloys, or graphite fibers.

The shape of the monocoque region 30 may vary in different versions of the present invention. It can be more rounded, with softer angles. It can have shell side walls with longitudinally extended flanges attached to longitudinally extending load beam flanges which project away from the floor region 34. In yet another embodiment (not shown), the monocoque shell 31 and the load beam 12 could be one single piece. The load beam 12 can either be casted directly with a monocoque region 30, or a monocoque region 30 can be formed by bending a side flap from the load beam 12 over the floor region 34 to form the monocoque shell 31 and then securing the edges of the flap to the edges of the load beam 12.

Basic Parameters of a Method for Manufacturing the Invention

The HSA 10 may be made by the following process:

First, form a load beam 12 of a substantially planar and resilient material. A preferred load beam 12 is wedge shaped and has a proximal end portion 14 and a distal end portion 15. It also has a smooth first surface 13 and a second surface. The proximal end portion 14 may be shaped for attachment to an actuator arm for systems that so require it. The distal end region may be shaped as a gimbal region 16 for supporting a head assembly 18 for gimballed motion relative to the surface of the data storage device. The load beam 12 also has a spring region 17 adjacent the proximal end portion 14 and a rigid floor region 34 between the spring region 17 and the gimbal region 16. The rigid floor region 34 will include a floor aperture 51 shaped to receive the IC 20.

The next step is to shape a monocoque shell 31, preferably out of a thin sheet of material. In this monocoque shell 31, side wall regions 36 support a flat ceiling region 32. The ceiling region 32 includes a ceiling aperture 50, that may have a similar but smaller shape than that of IC 20, and thus create an overlap edge 53.

We then proceed to attach the monocoque shell 31 over the floor region 34 of the second surface of the load beam 12, whereby the monocoque shell 31 and the load beam 12 form a stiffened monocoque region 30 encasing an inner chamber between the load beam 12 and the monocoque shell 31. The floor aperture 51 is aligned with the ceiling aperture 50.

An amplifying and/or processing IC 20 is provided and its edges are attached, usually by an adhesive, through floor aperture 51 to the overlapping edges 53 of the ceiling aperture 50. The IC has a plurality of control pins 22 and a plurality of read-write pins 21. Next, a head assembly 18, including electric terminals 25, is provided. It couples to the distal end portion 15. As the head may swivel or pivot with respect to the gimbal, the word "couples" is used to better describe this mechanical interaction.

The next manufacturing step involves connecting a first set 23 of electrical conductors between the head terminals 25 to the read-write pins 21. Finally, a second set 24 of electrical conductors is connected between the control pins 22 to exit terminal means 70 for electrically coupling the second set of conductors to circuitry outside of the head suspension assembly. The conductors usually run on the smooth first surface 13. Connections between the conductors and the pins can be accomplished by wire bonding.

The HSA 10 of the present invention offers stiffness that is orders of magnitude greater than that of the prior art, without any significant increase in mass. In fact, the described suspension have lower mass (and therefore weigh less), be easier and more efficient to manufacture, and reduce expensive etching and tooling. The rigidity of the HSA and the absence of surface topology processing leaves an optimal flat, smooth, and unmarred surface for placing the sets of electrical conductors for connection with the IC 20 inside the monocoque region 30. This significantly reduces the IC to head conductor length and therefore dramatically improves signal transmission by diminishing parasitic capacitances and resistances.

Although the present invention has been described with reference to preferred embodiments, workers skilled in the art will recognize that changes may be made in the form and detail without departing from the spirit and scope of the invention as set forth in the claims which follow.

What is claimed is:

1. A head suspension assembly for positioning a floating head assembly having electrical terminals over selected tracks on the surface of a rotating data storage device, said head suspension assembly comprising;

a first surface;

a proximal end region;

a gimbal region for providing gimballing support to a head assembly;

a spring region adjacent the proximal end region;

a monocoque region located in between the gimbal region and the spring region, where the monocoque region is a hollow shell having a closed plane figure cross sectional profile and covering an inner chamber, the monocoque region including a ceiling region and a floor region separated and spaced from each other;

an integrated circuit substantially encased inside the inner chamber, between the ceiling region and the floor region, the integrated circuit having a plurality of control pins and a plurality of read-write pins;

a first set of electrical conductors connecting electrical terminals on a head assembly to the read-write pins;

a second set of electrical conductors connecting the control pins to exit terminal means for electrically coupling the second set of conductors to circuitry outside of the head suspension assembly wherein the first and the second set of conductors are placed over the first surface and include conductors made of a conductive material laid down in long strips atop a thin insulating coating which electrically isolates the conductors from the first surface.

2. The head suspension assembly of claim 1, the floor region having a floor aperture, for ventilation and access to the integrated circuit.

3. The head suspension assembly of claim 2, the ceiling region having a ceiling aperture centered and aligned with respect to the floor aperture.

4. The head suspension assembly of claim 3, wherein the ceiling aperture has smaller dimensions than the integrated circuit and edges of the integrated circuit attach to edge of the ceiling aperture.

5. The head suspension assembly of claim 2, wherein the floor aperture is larger than the integrated circuit.

6. The head suspension assembly of claim 1, further comprising a separate monocoque shell region that includes the ceiling region and attaches to the floor region to form the monocoque region.

7. The head suspension assembly of claim 1, wherein the exit terminal means includes at least one terminal tab including a side wing extending outwardly from a side of the proximal end terminal of the head suspension assembly, the second set of conductors ending at the edge of the terminal tab into a wider contact pad.

8. The head suspension assembly of claim 7, wherein the terminal tab includes an axis of bend parallel to its edge and wherein the side wing bends along the axis of bend.

9. The head suspension assembly of claim 8, wherein the second set of conductors traverses the axis of bend at an acute angle.

10. The head suspension assembly of claim 1, wherein the exit terminal means includes two terminal tabs, each located at one side of the proximal end portion and wherein at least half of the second set of conductors ends at one terminal tab and the rest end at the other.

11. The head suspension assembly of claim 1, selected regions of the first surface further comprising a partial groove for receiving the sets of electrical conductors.

12. A disk drive comprising the head suspension assembly of claim 1.

13. A head suspension assembly for positioning a floating head assembly having electrical terminals over selected tracks on the surface of a rotating data storage device, said head suspension assembly comprising;

a first surface;

a proximal end region;

a gimbal region for providing gimballing support to a head assembly;

a head assembly, including electric terminals, coupled to the gimbal region;

a spring region adjacent the proximal end region;

a monocoque region located in between the gimbal region and the spring region, where the monocoque region is a hollow shell having a closed plane figure cross sectional profile and covering an inner chamber, the monocoque region including a ceiling region and a floor region separated and spaced from each other;

an integrated circuit substantially encased inside the inner chamber, between the ceiling region and the floor region, the integrated circuit having a plurality of control pins and a plurality of read-write pins;

a first set of electrical conductors connecting the head assembly electrical terminals to the read-write pins;

a second set of electrical conductors connecting the control pins to exit terminal means for electrically coupling the second set of conductors to circuitry outside of the head suspension assembly wherein the first and the second set of conductors are placed over the first surface and include conductors made of a conductive material laid down in long strips atop a thin insulating coating which electrically isolates the conductors from the first surface.

14. A method for manufacturing a head suspension assembly for positioning and electrically coupling a floating head assembly over selected tracks on the surface of a rotating data storage device, said method of manufacturing comprising the steps of:

forming a suspension of a substantially planar and resilient sheet of material, said suspension having a first surface, a second surface, a proximal end portion, and a gimbal portion constructed and arranged for gimballed support of a head assembly relative to the surface of the data storage device, said suspension also having a spring region adjacent the proximal end portion and a rigid floor region between the said spring region and the gimbal portion, the rigid floor region including a floor aperture;

forming a monocoque shell, the monocoque shell having side wall regions supporting a ceiling region, the ceiling region having a ceiling aperture;

attaching said monocoque shell to the second surface of the floor region of the suspension; whereby the said monocoque shell forms at least the floor region into a stiffened monocoque region encasing an inner chamber between the suspension and the monocoque shell, the ceiling aperture centered and aligned with respect to the floor aperture;

providing an integrated circuit, wherein the apertures are shaped and arranged for holding said integrated circuit, the integrated circuit having a plurality of control pins and a plurality of read-write pins;

attaching the integrated circuit to the monocoque region so it is substantially encased inside the inner chamber of the monocoque region and is centered and aligned with the ceiling aperture;

providing a head assembly, including electric terminals;

coupling the head assembly to the gimbal portion;

placing a first set of electrical conductors on the first surface, the first set of conductors connecting the electrical terminals on the head assembly to the read-write pins on the integrated circuit;

placing a second set of electrical conductors on the first surface, the second set of conductors connecting the control pins to exit terminal means that serve for electrically coupling the second set of conductors to circuitry outside of the head suspension assembly.

15. The method of manufacture of claim 14, wherein the ceiling aperture has a similar but smaller shape than the integrated circuit and the floor aperture is larger than the integrated circuit, and wherein the integrated circuit is introduced through the floor aperture and edges of the integrated circuit are attached to edges of the ceiling aperture.

16. The method of manufacture of claim 14, further including using welds to attach the suspension and the monocoque shell.

17. The method of manufacture of claim 14, further including using an adhesive to attach the suspension and the monocoque shell.

18. The method of manufacture of claim 14, wherein the suspension and the monocoque shell are attached by being crimped together.

* * * * *